United States Patent
Dupre

(10) Patent No.: US 8,613,185 B2
(45) Date of Patent: Dec. 24, 2013

(54) METHOD AND DEVICE FOR THE DETECTION OF A THRUST DISSYMMETRY OF AN AIRCRAFT DURING A BRAKING

(75) Inventor: Alain Dupre, Fontenilles (FR)

(73) Assignee: Airbus Operations SAS, Toulouse (FR)

( * ) Notice: Subject to any disclaimer, the term of this patent is extended or adjusted under 35 U.S.C. 154(b) by 1216 days.

(21) Appl. No.: 12/493,094

(22) Filed: Jun. 26, 2009

(65) Prior Publication Data
US 2009/0320445 A1 Dec. 31, 2009

(30) Foreign Application Priority Data

Jun. 30, 2008 (FR) .................................... 08 03661

(51) Int. Cl.
*F02K 1/76* (2006.01)
(52) U.S. Cl.
USPC ....... 60/39.091; 60/226.2; 60/230; 244/110 B
(58) Field of Classification Search
USPC ............... 60/226.2, 230, 39.091; 239/265.19, 239/265.25, 265.29; 244/110 B, 76 R
See application file for complete search history.

(56) References Cited

U.S. PATENT DOCUMENTS

| 3,086,360 | A | | 4/1963 | Gavin | |
|---|---|---|---|---|---|
| 5,188,316 | A | * | 2/1993 | Dressler et al. | ............... 244/234 |
| 5,826,833 | A | * | 10/1998 | Evans et al. | ................... 244/183 |
| 5,960,626 | A | | 10/1999 | Baudu | |
| 2005/0116096 | A1 | * | 6/2005 | Andre et al. | ................ 244/75 R |
| 2011/0108665 | A1 | * | 5/2011 | Abrial et al. | ............. 244/110 B |

FOREIGN PATENT DOCUMENTS

EP 1 512 627 3/2005

OTHER PUBLICATIONS

Preliminary Search Report dated Apr. 7, 2009 w/ English translation.

* cited by examiner

*Primary Examiner* — Phutthiwat Wongwian
*Assistant Examiner* — Carlos A Rivera
(74) *Attorney, Agent, or Firm* — Dickinson Wright PLLC

(57) ABSTRACT

Disclosed is a ventilating air intake arrangement of an aircraft. The arrangement includes at least one air duct connected to an air intake orifice. At least one confined zone connects with the air duct and the air intake orifice, and the confined zone is configured in a manner in which outside air enters through the air intake orifice. A controllable mobile element modifies the flow of air entering the confined zone by varying a cross section of the air duct. A control unit is used to control the controllable mobile element, with the control unit being arranged so as to control the controllable mobile element to vary the cross section of the at least one air duct as a function of speed and altitude of the aircraft.

10 Claims, 3 Drawing Sheets

METHOD AND DEVICE FOR THE DETECTION OF A THRUST DISSYMMETRY OF AN AIRCRAFT DURING A BRAKING

BACKGROUND OF THE INVENTION AND DESCRIPTION OF THE PRIOR ART

The present invention relates to a method and a device for detecting dissymmetry of thrust in an aircraft under braking with reverse thrust, for example during a landing or during an aborted takeoff. The invention also relates to an aircraft provided with such a device.

It is known that many aircraft, particularly civilian transport aircraft, are equipped with thrust reversers to improve the braking of said aircraft taxiing along the ground by applying reverse thrust.

It is also known that, under braking on the ground, reverse thrust is applied manually by the crew of said aircraft by, for example, bringing the throttle control levers of the various engines from an intermediate landing position into a reverse thrust position corresponding to the deployment of the thrust reversers of the engine and the application of an appropriate engine speed.

However, because of the high workload (particularly in the case of aircraft that have two or more engines) which is particularly stressful during landing, one of the pilots may forget to position the throttle control lever of one of the engines in reverse thrust position, which means that that engine will continue to apply forward thrust, unlike the other engines which are applying rearwardly directed thrust. An oversight such as this then leads to dissymmetry in the thrust of the aircraft engines and makes this engine more difficult to control, or may even make it uncontrollable.

SUMMARY OF THE INVENTION

It is an object of the present invention to remedy these disadvantages and, in particular, to detect such an dissymmetry in the thrust.

To this end, according to the invention, the method for detecting dissymmetry of thrust in an aircraft provided with at least two engines that are symmetric with respect to the fuselage, each equipped with a thrust reverser, under braking with reverse thrust, the speeds of said engines being controlled individually by control levers respectively associated with said engines and able to occupy several positions including a position corresponding to reverse thrust applied by said thrust reversers, is notable in that:
a) it is detected that said aircraft is in contact with the ground;
b) when said aircraft is in contact with the ground, a check is performed to ensure that each of said control levers is in said reverse thrust position;
c) if at least one of said control levers is not in said reverse thrust position, at least the engine associated with said control lever that is not in the reverse thrust position is set to low idle speed; and
d) said step c) is aborted when at least said control lever that is not in said reverse thrust position is brought into the latter position by deliberate action by one of the pilots of said aircraft.

Thus, by virtue of the invention, by setting those engines to low idle speed the control lever of which is not in the reverse thrust position, no forward thrust is applied to the aircraft, which means that the lateral dissymmetry in thrust on this aircraft is smaller. In consequence, the aircraft is easier to control, further improving braking and making it safer.

It is also possible perhaps to abort said step c) when the taxi speed of said aircraft is at most equal to a predetermined speed threshold.

As a preference, said predetermined speed threshold is at least approximately equal to the taxi speed allowed on a taxiway.

According to one advantageous feature of the invention, with said aircraft provided with a thrust controller that can be deactivated when at least one of said control levers is in said reverse thrust position, said thrust controller is especially reactivated to set to low idle speed that engine the control lever of which is not in said reverse thrust position. Furthermore, with said thrust controller provided with manual deactivation means, said step c) may be aborted by deliberate operation of said deactivation means by one of the pilots of said aircraft; and if said thrust controller is deactivated, said engine is advantageously kept at low idle speed at least until such time as said associated control lever is no longer in said reverse thrust position.

Thus, additional action by the pilots on the control lever that is not in the reverse thrust position is needed in order to alter the low idle speed of the associated engine, set beforehand by the thrust controller, even when this thrust controller has been manually deactivated by the pilots. The result of this is to make the transition of the thrust controller from the activated state to the deactivated state safer.

As an alternative, in the event of deactivation of said thrust controller, it is possible perhaps to revert directly to manual control of the speed of the engine or engines the associated control lever of which is not in the reverse thrust position.

Advantageously, following detection of contact between the aircraft and the ground and detection that one or more levers is or are not in the reverse thrust position, a warning is intended for the pilots of said aircraft is emitted to alert them to the fact that these levers are not in the reverse thrust position, for example prior to implementation of the speed-setting step c).

According to another feature of the invention, with a timeout initiated upon contact of said aircraft with the ground, said step c) is aborted when said timeout has elapsed. As an alternative or in addition, it may be possible to prevent step c) from being implemented after said timeout has elapsed, when said step c) has not been initiated prior to said timeout having elapsed.

In addition, following braking with reverse thrust and the setting to the low idle position of those engines the control lever of which is not in the reverse thrust position, as mentioned hereinabove, said step c) is aborted as soon as each of said control levers is brought into a position corresponding to takeoff.

Moreover, with said aircraft equipped with sensors that detect contact with the ground, contact of said aircraft with the ground is considered to be established if, for example, the following conditions are satisfied:
the altitude of said aircraft is at most equal to a predetermined altitude threshold;
said aircraft is in a landing configuration; and
said sensors detect contact between said aircraft and the ground.

In order to implement the method according to the invention, there is advantageously provided a device on board an aircraft provided with at least two engines that are symmetric with respect to the fuselage, each equipped with a thrust reverser, and the engine speeds of which are controlled individually by control levers respectively associated with said engines and able to occupy several positions including a position corresponding to reverse thrust applied by said thrust reversers.

Advantageously, said device comprises:
  means of detecting contact between said aircraft and the ground;
  means of determining that at least one of said control levers has not been positioned in said reverse thrust position;
  engine speed setting means capable of setting to low idle speed said engine the control lever of which is not in said reverse thrust position until such time as at least said control lever, which is not in said reverse thrust position, is brought into the latter position by deliberate action by one of the pilots of said aircraft.

If appropriate, three additional conditions for aborting the imposition of low idle speed on said engine may be:
  the taxi speed of said aircraft is at most equal to a predetermined speed threshold;
  a timeout of predetermined duration, initiated upon contact between said aircraft and the ground, has elapsed;
  each of said control levers is in a position corresponding to the takeoff position for said aircraft.

Advantageously, the device comprises warning means for emitting a warning to the crew when said aircraft is in contact with the ground and at least one of said control levers is not in said reverse thrust position.

The invention also relates to an aircraft provided with a device as specified hereinabove.

BRIEF DESCRIPTION OF THE DRAWINGS

The figures of the attached drawing will make it easy to understand how the invention may be embodied. In these figures, identical references denote elements that are similar.

DESCRIPTION OF THE PREFERRED EMBODIMENT

Figure 1:
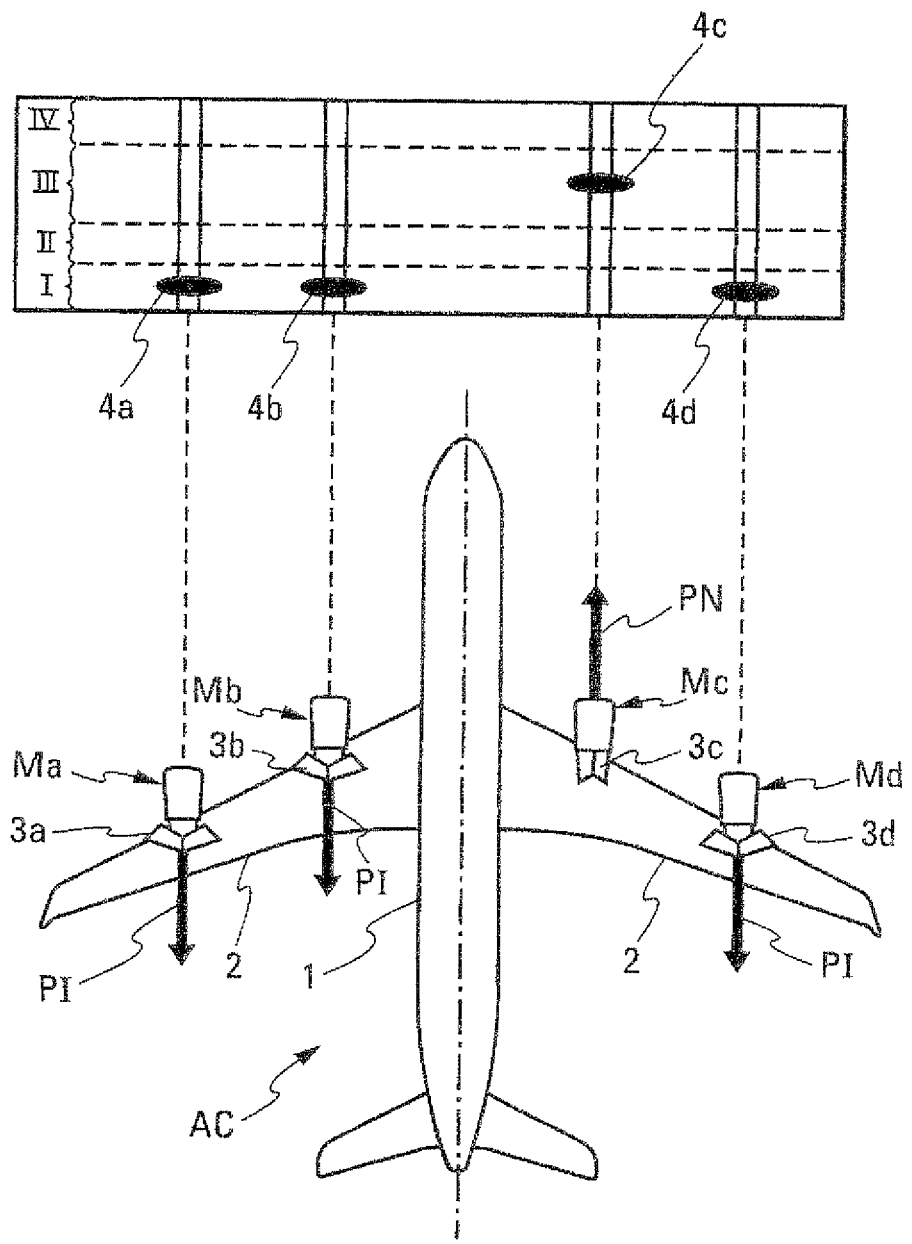
FIG. 1 depicts schematically from beneath a four-engined aircraft, of which the engines are each equipped with a thrust reverser. In this FIG. 1, the position of the engine throttle control levers associated with each of said engines respectively, is also shown.

The aircraft AC depicted schematically from beneath in FIG. 1, comprises a fuselage 1 and two wings 2 which are symmetric with respect to said fuselage 1. Mounted on each of the wings are an inboard engine Mb and Mc and an outboard engine Ma and Md, each fitted with a thrust reverser 3b, 3c, 3a and 3d respectively. Of course, as an alternative, the aircraft AC could be a two-engined aircraft or even a three-engined aircraft with two of the three engines symmetric with respect to the fuselage 1.

In the usual way, the aircraft AC is provided with a thrust controller 14 (see FIG. 3) able automatically, when activated by the crew (not depicted) to control the thrust of each of the four engines Ma to Md of said aircraft AC during climb, cruising and descent phases in order to reduce the workload on the crew. The thrust controller 14 is moreover deactivated during the critical phase of takeoff and of coming to a standstill on the runway for safety reasons.

If the thrust controller 14 is deactivated, the speed of each of the engines Ma to Md is controlled by the crew via an engine throttle control lever 4a to 4d.

As shown by FIG. 1, each lever 4a to 4d may occupy any arbitrary position, for example, from among the following four positions:
  a first position I in which the thrust reverser 3a to 3d associated with the engine controlled by the lever 4a to 4d in question is in the deployed position. In this first position I, reverse thrust, applied by the thrust reverser 3a to 3d, is implemented by setting the engine to an appropriate speed;
  a second position II in which low idle speed is applied to said engine, the thrust reverser 3a to 3d being in the furled position;
  a third position III for which an intermediate engine speed, somewhere between low idle and full throttle is applied to said engine, the thrust reverser 3a to 3d being furled; and
  a fourth position IV in which the aircraft AC is in the takeoff configuration. In the fourth position IV, the thrust reverser 3a to 3d of the engine Ma to Md in question is furled and full throttle for example is applied to said engine.

In the usual way, when the aircraft AC is under braking with reverse thrust (for example during a landing), the pilots bring the control levers 4a to 4d, for example, from the third position III into the first position I in order manually to control braking with reverse thrust.

Now, it may happen that one of the pilots of the aircraft AC forgets to bring one of the control levers 4a to 4d into the first position I. Thus, as shown by the example of FIG. 1, the control lever 4c of the engine Mc is not positioned in reverse thrust position I, whereas the others (levers 4a, 4b and 4d) are.

Thus, the thrust reversers 3a, 3b and 3d associated with the engines Ma, Mb and Md are deployed, whereas the reverser 3c of engine Mc remains in the furled position. The thrust from the engines Ma, Mb and Md (embodied by the arrow PI) is then directed toward the rear of the aircraft AC, unlike that from the engine Mc (embodied by the arrow PN) which is directed forward, thus giving rise to a thrust dissymmetry in the aircraft AC.

Figure 2:
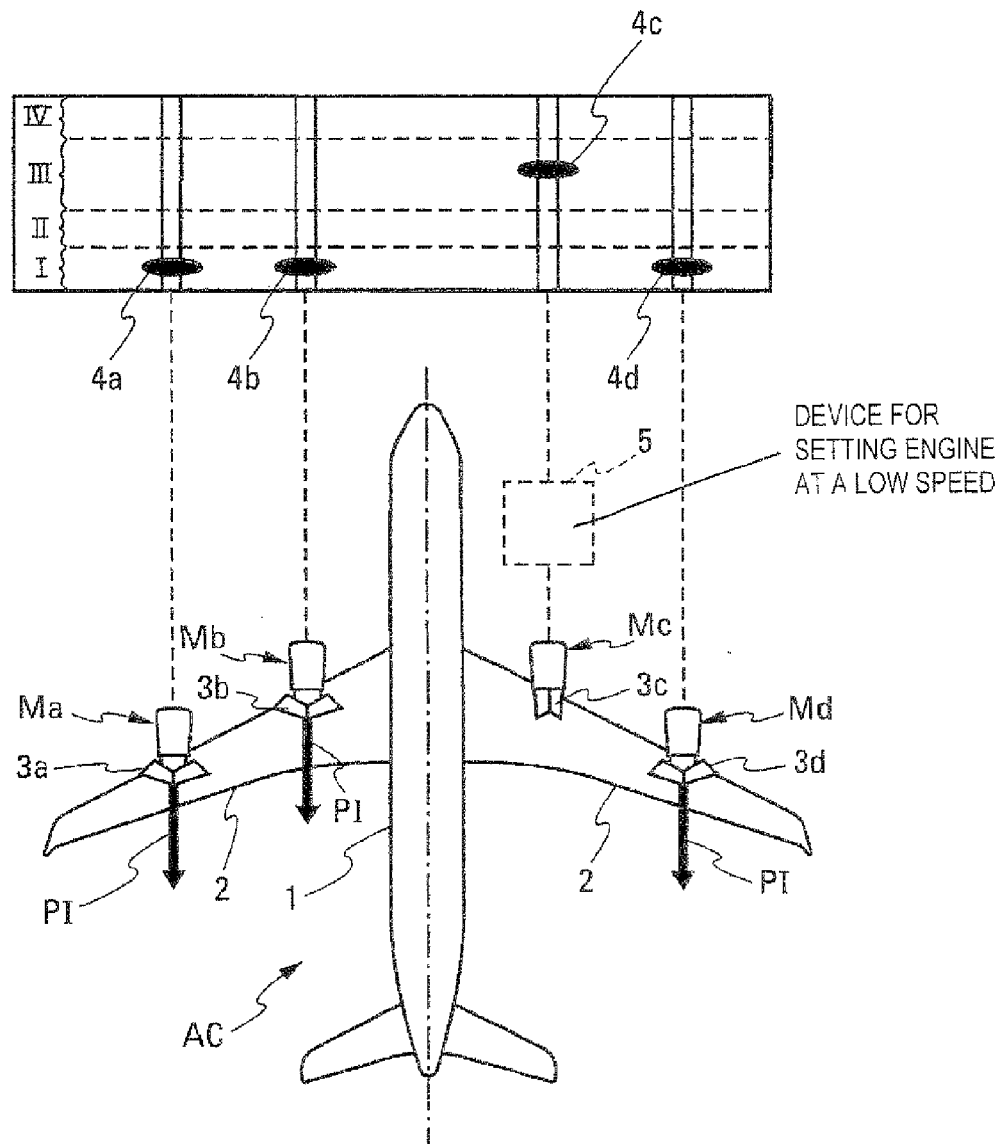
FIG. 2 is a figure similar to FIG. 1, which also schematically illustrates the device of the invention mounted on board said aircraft of FIG. 1.

As FIG. 2 shows, the aircraft AC implementing the invention, is similar to the one described hereinabove in conjunction with FIG. 1, except that it advantageously comprises a device 5 capable of setting the engine Mc, for which the control lever 4c has not been brought into the reverse thrust first position I, to low idle speed.

Figure 3:
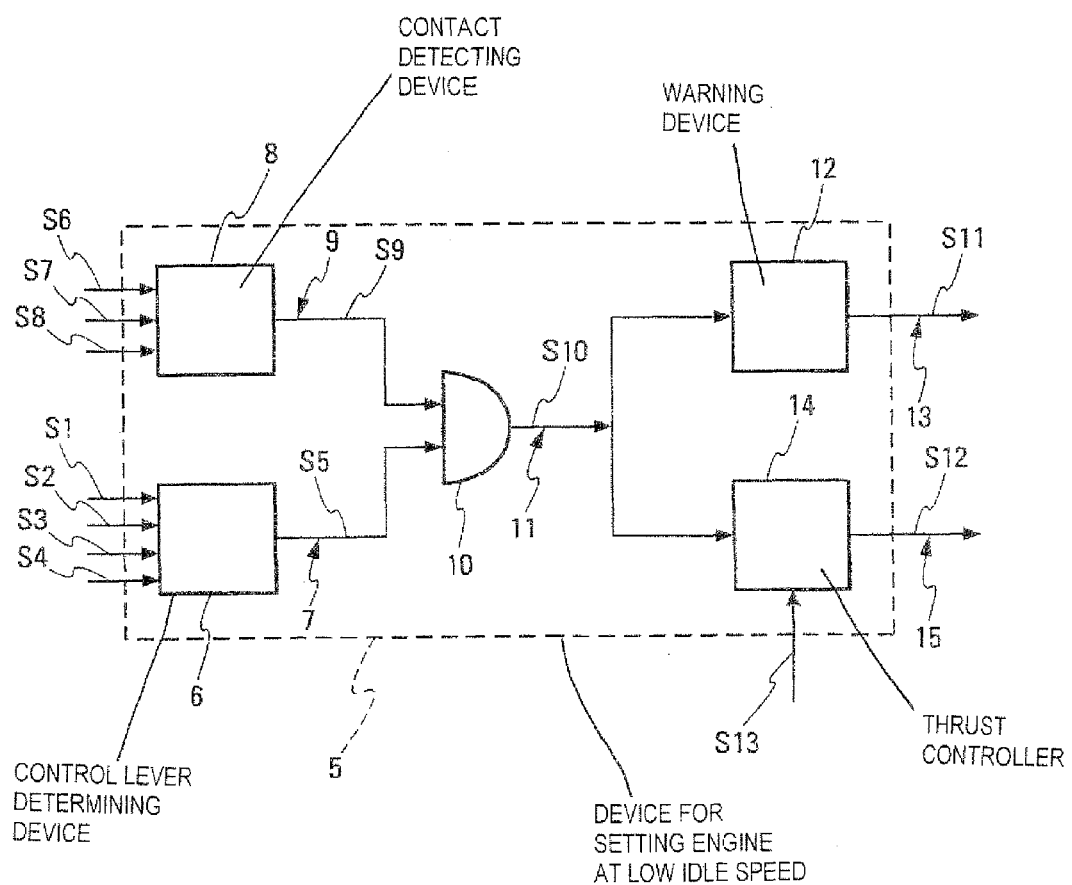
FIG. 3 is a schematic depiction in the form of a block diagram of the device according to the invention depicted in FIG. 2.

More specifically, as illustrated in FIG. 3, the device 5 of the invention notably comprises:
  determining means 6 for determining the failure to position at least one of the control levers 4a to 4d in said first position I. These determining means 6 may receive the signals S1, S2, S3 and S4 representative of the position of control levers 4a to 4d respectively. The determining means 6 are also able to deliver, at their output 7, a signal S5 representative of a failure to position at least one of the control levers 4a to 4d in the first position I. Thus, according to the example of FIG. 2, the determining means 6 deliver a signal S5 representative of the fact that the control lever 4c associated with engine Mc is not in the first position I;
  detection means 8 detecting contact between said aircraft AC and the ground. These detection means 8 may receive the following figures:

a signal S6 representative of contact between the aircraft AC and the ground and emitted, for example, by pressure sensors (not depicted);

a signal S7 representative of the fact that the aircraft AC is in a predetermined landing configuration; and a signal S8 representative of the altitude of the aircraft AC when this altitude is at most equal to a predetermined altitude threshold;

such that, when they simultaneously receive all of these signals S6 to S8, the detection means 8 are able to transmit, on their output 9, a signal S9 representative of contact between the aircraft AC and the ground. Moreover, as soon as contact between the aircraft AC and the ground is signaled, it is possible to trigger a timeout of predefined magnitude T;

a logic gate 10, of the two-input AND gate type receiving the signals S5 and S9. When S5 and S9 reach the inputs of the AND gate 10, this gate is able to deliver, on its output 11, an activation signal S10 specifying which engines (engine Mc in the example of FIG. 2) do not have their control lever (4c in the example) in the first position I;

warning means 12 which are controlled by the signal S10. These warning means 12 are able to deliver, on their output 13, a signal S11 that can trigger an audible warning in the cockpit of the aircraft AC and/or a visible warning on the flight interfaces; and the thrust controller 14 which can receive the signal S10. According to the invention illustrated for example in FIG. 2, as soon as the signal S10 is received, the thrust controller 14 is especially reactivated in such a way that, via the signal S12 delivered on its output 15, it sets the speed of engine Mc (the control lever 4c of which is not in the first position I) to low idle speed, preferably after (for example a few seconds after) the warnings are triggered. The engine Mc is kept at this low idle speed by the thrust controller 14 until it receives a deactivation signal S13, for example representative of the fact that at least one of the following conditions is satisfied:

the control lever 4c for engine Mc is brought into the first position I by deliberate action by one of the pilots of the aircraft AC;

the taxi speed of the aircraft AC is at most equal to a predetermined speed threshold, preferably at least approximately equal to the taxi speed allowed along a taxiway;

after the engine Mc controlled by the lever 4c that is not in the reverse thrust position has been set to low idle speed, during braking with reverse thrust, each of the control levers 4a to 4d of engines Ma to Md is brought into the takeoff position IV;

the timeout triggered upon contact between the aircraft AC and the ground has elapsed.

Furthermore, through a deliberate operation on a deactivation button (not depicted), one of the pilots can manually deactivate the thrust controller 14. The engine Mc can then be kept automatically at low idle speed as long as no change in the position of its control lever 4c is observed or, alternatively, it is possible to revert to manual control of the speed of the engine Mc by the pilots by means of the associated control 4c.

The invention claimed is:

1. A method for detecting dissymmetry of thrust in an aircraft provided with at least two engines that are symmetric with respect to a fuselage of the aircraft, each engine being equipped with a thrust reverser for braking with reverse thrust, and with each engine being individually controlled by an associated control lever, said method comprising the steps of:

a) detecting, from signals received from the aircraft, ground contact between said aircraft and the ground;

b) determining a condition in which said aircraft is detected to be in contact with the ground and at least one control lever is not in a reverse thrust position;

c) delivering a signal setting idle speed of the engine associated with the at least one control lever determined to be not in said reverse thrust position; and d) aborting said step c) at a condition in which said at least one control lever that is not in said reverse thrust position is brought into the reverse thrust position.

2. The method as claimed in claim 1, wherein, said step c) is aborted at a condition in which taxi speed of said aircraft is at most equal to a predetermined speed threshold.

3. The method as claimed in claim 2, wherein said predetermined speed threshold is at least approximately equal to the taxi speed allowed on a taxiway.

4. The method as claimed in claim 1, wherein said signal setting idle speed is delivered by a thrust controller, which is configured to be deactivated at a condition in which said at least one control lever is in said reverse thrust position, and said thrust controller is configured to be reactivated to set the associated engine to idle speed at a condition in which the control lever of the associated engine is not in said reverse thrust position.

5. The method as claimed in claim 4, wherein:

said thrust controller is configured to be manually deactivated; and at the condition in which said thrust controller is deactivated, said engine is kept at low idle speed at least until such time as said associated control lever is no longer in said reverse thrust position.

6. The method as claimed in claim 1, wherein, a timeout is initiated upon contact of said aircraft with the ground, and said step c) is aborted when said timeout has elapsed.

7. The method as claimed in claim 1, wherein, after said engine controlled by said associated control lever that is not in the reverse thrust position is set to idle, said step c) is aborted as soon as each control lever is brought into a takeoff position.

8. The method as claimed in claim 1, wherein, the signals for detecting the ground contact are from sensors that detect contact with the ground according to the following conditions:

altitude of said aircraft is at most equal to a predetermined altitude threshold;

said aircraft is in a landing configuration; and said sensors detect contact between said aircraft and the ground.

9. A device for setting idle speed of an aircraft engine equipped with a thrust reverser, said device comprising a contact detecting device configured to receive signals from the aircraft and detect from the received aircraft signals ground contact between said aircraft and the ground;

a control lever determining device configured to receive signals representing a plurality of positions of a control lever individually associated with each engine and deliver an output signal indicating that said control lever is not in a reverse thrust position;

a thrust controller configured to receive the output signal from the control lever determining device indicating that the control lever is not in said reverse thrust position and deliver a signal setting idle speed of the associated engine, wherein the thrust controller is further configured to receive a deactivation signal indicating said control lever, which is not in said reverse thrust position, is brought into the reverse thrust position.

10. An aircraft, which comprises a device as specified in claim 9.

* * * * *